United States Patent Office 3,175,998
Patented Mar. 30, 1965

3,175,998
ω-VINYLOXYALKYLPHOSPHONATES, POLYMERS THEREOF AND METHOD FOR MAKING SAME
Robert Rabinowitz, Stamford, Conn., assignor to American Cyanamid Company, New York, N.Y., a corporation of Maine
No Drawing. Filed Feb. 10, 1961, Ser. No. 88,250
12 Claims. (Cl. 260—85.5)

This invention relates to a novel class of unsaturated phosphonates. More particularly, it relates to ω-vinyloxyalkylphosphonates, to polymers thereof, and to methods for preparing these ω-vinyloxyalkylphosphonates and their polymers.

It is therefore an object of this invention to provide novel ω-vinyloxyalkylphosphonates. A further object is to provide novel polymers of ω-vinyloxyalkylphosphonates. Still another object is to provide methods for preparing these new monomers and polymers. Other objects will become apparent from a consideration of the following detailed description and examples.

This class of ω-vinyloxyalkylphosphonates may be depicted by the following structural formula:

$$CH_2=CHORP(O)(OR')_2$$

in which R is selected from the group consisting of alkylene radicals having from two to ten carbon atoms and R' is selected from the group consisting of aryl radicals and alkyl radicals having from one to eighteen carbon atoms.

This novel class of phosphonates is readily prepared by condensing at elevated temperature a ω-haloalkyl vinyl ether of the formula:

$$CH_2=CHORX$$

in which R has the meaning as defined hereinabove and X is a halogen atom selected from the group consisting of chlorine, bromine and iodine, with a trialkyl phosphite, a mixed trialkyl phosphite, or a mixed aryl alkyl phosphite of the formula:

$$P(OR')_3$$

in which R' has the meaning as defined hereinabove and at least one of the radicals represented by R' is an alkyl radical having from one to eighteen carbon atoms or an alkali metal salt of a dialkyl acid phosphite, or an alkali metal salt of an alkyl aryl acid phosphite or an alkali metal salt of a diaryl acid phosphite. The course of the reaction is believed to proceed in the manner shown in the following reaction scheme in which vinyl 2-chloroethyl ether and triethyl phosphite are illustratively employed:

$$ClCH_2CH_2OCH=CH_2 + P(OC_2H_5)_3 \rightarrow C_2H_5Cl + CH_2=CHOCH_2CH_2P(O)(OC_2H_5)_2$$

The reaction proceeds readily at temperatures between about 50° to about 200° C. Following completion of the reaction, the ω-vinyloxyalkylphosphonate product is readily separated from the reaction mixture by conventional methods, e.g. distillation and the like. Depending upon the choice of initial reactants, products having a wide range of physical properties may be obtained. Such products range from moderately high boiling water soluble products to high boiling water insoluble products. ω-Vinyloxyalkylphosphonates of this class finds particular application in the formation of polymers useful in the preparation of fibers, films, sheets, as coatings for metals, fabrics, leather, etc., and as additives for polymers so as to improve flame resistance and heat resistance thereof.

Illustrative vinyl ω-haloalkyl ethers which may be employed in the process of this invention to obtain products having the structural formula as shown hereinabove are vinyl 2-chloroethyl ether, vinyl 3-chloropropyl ether, vinyl 4-chlorobutyl ether, vinyl 5-chloroamyl ether, vinyl 6-chlorohexyl ether, vinyl 7-chloroheptyl ether, vinyl 8-chlorooctyl ether, vinyl 9-chlorononyl ether and vinyl 10-chlorodecyl ether. While the listing of suitable vinyl ω-chloroalkyl ethers has been expressly set forth it will be readily understood that the vinyl ω-bromo-and iodo-alkyl ethers may likewise be advantageously employed in the production of the ω-vinyloxyalkylphosphonates of this invention. The vinyl ω-haloalkyl ethers which are not commercially available may be easily synthesized by reacting acetylene with a suitable ω-halo-1-alkanol or by reacting acetaldehyde with a ω-halo-1-alkanol followed by thermal decomposition of the resulting acetal intermediate.

Among the trialkyl phosphites which may be employed there may be mentioned trimethyl phosphite, triethyl phosphite, tripropyl phosphite, triisopropyl phosphite, tributyl phosphite, triisobutyl phosphite, triamyl phosphite, trihexyl phosphite, triheptyl phosphite, trioctyl phosphite, trinonyl phosphite, tridecyl phosphite, triundecyl phosphite, tridodecyl phosphite, trioctadecyl phosphite and the like. As was stated hereinabove, mixed alkyl phosphites, i.e. trialkyl phosphites wherein the alkyl groups are different, may be employed in the process of this invention. Among such typical mixed alkyl phosphites there may be mentioned methyl dihexyl phosphite, methyl diheptyl phosphite, methyl dioctyl phosphite, methyl dinonyl phosphite, methyl didecyl phosphite, methyl diundecyl phosphite, methyl didodecyl phosphite and the like. The use of such mixed alkyl phosphites is particularly desirable in that the separation of by-product alkyl halide is more easily accomplished when such a mixed alkyl phosphite having a lower alkyl R' substituent is employed since the lower alkyl halides are more easily separated from the reaction mixture than the higher alkyl halides which are formed when a trialkyl phosphite having a long chain present for all R' substituents is employed.

Similarly, the use of mixed alkyl aryl phosphites is advantageous for the preparation of ω-vinyloxyalkylphosphonates wherein R' substituents are aryl radicals. Thus, inter alia, methyl diphenyl phosphite, ethyl diphenyl phosphite, methyl ditolyl phosphite, ethyl ditolyl phosphite and the like may all be employed. Similarly, of course, other mixed alkyl phosphites and mixed alkyl aryl phosphites, e.g. dimethyl hexyl phosphite, dimethyl phenyl phosphite, etc., may be utilized in the process of this invention so as to yield ω-vinyloxyalkylphosphonates in which both R' substituents are not the same. The use of mixed alkyl phosphonites and mixed alkyl aryl phosphites is generally preferred in that the higher members of the phosphite series may form undesirable by-products. As alkali metal salts of dialkyl acid phosphites, diaryl acid phosphites and alkyl aryl acid phosphites the sodium, potassium, lithium, etc. salts of dimethyl acid phosphite, diethyl acid phosphite, di-i-propyl acid phosphite, etc. and of methyl phenyl acid phosphite, ethyl phenyl acid phosphite, methyl tolyl acid phosphite, ethyl tolyl acid phosphite, etc. and of diphenyl acid phosphite, ditolyl acid phosphite, etc. are illustrative and can be used.

Alternatively, ω - vinyloxyalkylphosphonates having lower alkyl R' substituents, e.g. methyl, ethyl, etc., may be readily converted to ω-vinyloxyalkylphosphonates having higher alkyl R' substituents e.g. dodecyl, tridecyl, octadecyl and the like, by conventional transesterification procedures.

It is generally desirable that the reaction be conducted in the presence of an inert reaction medium particularly for preparation of the lower alkyl ω-vinyloxyalkylphosphonates inasmuch as the reaction is one which is conducted at a moderately high temperature and unless a high boiling reaction medium is present the reaction proceeds only at a very slow rate. The use of high boiling hydrocarbon solvents which are inert to the reactants and to the product and which boil at a temperature different from the phosphonate product in order to bring about ease of separation is advantageous. Thus, tetralin, dodecane, dichlorobenzene, trichlorobenzene, and similar high boiling hydrocarbons are among those preferred. In those cases wherein a high boiling trialkyl phosphite or mixed alkyl phosphite or mixed alkyl aryl phosphite is employed the use of a solvent having a high boiling point is not absolutely required. Such phosphites as those just mentioned have a boiling point sufficiently high enough so as to permit the reaction to proceed at a moderate and reasonable rate.

As will be noted from the reaction scheme postulated hereinabove equimolecular quantities of the reaction are usually employed. However, it is generally desirable to employ a slight excess of trialkyl phosphite or mixed alkyl phosphite or mixed alkyl aryl phosphite or alkali metal salt of the corresponding acid phosphite in order to assure substantially complete reaction, particularly since many phosphites are thermally converted to phosphonates and many phosphites are capable of reacting with the alkyl halides which are produced in the reaction. The reactants may be admixed initially and reaction allowed to continue in this manner or alternatively the vinyl ω-haloalkyl ether may be added to the tertiary phosphite reactant or the teriary phosphite reactant may be added to the vinyl ω-haloalkyl ether reactant gradually during the course of the reaction. A preferred practice is the stepwise addition of vinyl ω-haloalkyl ether to tertiary phosphite.

The time required for reaction is, of course, dependent upon the particular reactants employed, temperature and quantity of the reactants present. In general, reaction times range from about several hours to about several days. The reaction is usually conducted at atmospheric pressure although in some instances it is desirable to employ reduced pressure in order to separate the normally high boiling products from the reaction mixture. Since many of the products which are formed during the course of the reaction are low boiling, the use of pressures higher than atmospheric is usually to be avoided.

The temperature employed in the reaction as was mentioned hereinabove is generally between about 50° C. and about 200° C. No particular advantage is seen to be derived from conducting the eraction at a temperature much lower than 50° C. in that reaction, if at all, proceeds slowly. Furthermore, the use of temperatures in excess of about 200° C. is undesirable in that stability of the starting materials (e.g. phosphites) at temperatures greater than about 200° C. sometimes becomes a problem.

The compounds of the present invention readily form homopolymers and copolymers with another copolymerizable unsaturated compound by any of the known methods employed in the art. The molecular weight of the polymers will depend somewhat on the method and conditions employed in the polymerization. Thus, the molecular weight of the polymers can be low and correspond to a product of only three or four molecular units, or it can be higher and correspond to a product of up to about 500 or more molecular units. Polymers can be prepared, for example, by heating the novel ω-vinyloxyalkylphosphonates in the presence or absence of another copolymerizable unsaturated compound and in the presence of substances which are known to initiate the polymerization of vinyl type compounds. Typical catalysts include organic peroxides such as benzoyl peroxide, acetyl peroxide, acetyl benzoyl peroxide, lauroyl peroxide, oleoyl peroxide, di-t-butyl peroxide, bisazoisobutyronitrile, etc., the persulfates such as the alkali peroxides (e.g. sodium, potassium, etc.) or ammonium persulfate, hydrogen peroxide, etc. Actinic or ultraviolet light can be used alone or to supplement the above catalysts or initiators. Certain so-called "accelerators" such as sodium bisulfite, etc. or "chain regulators" such as dodecyl mercaptan, etc. can be used in conjunction with the usual polymerization catalysts or initiators if desired.

The polymerization can also be carried out by the bead or emulsion method in which water or some other medium in which the monomers are substantially insoluble is used with or without the aid of dispersing agents, the polymer thus precipitating as it is formed. Polymerization can also be carried out in the presence of an organic solvent for the monomers, but in which the polymers are substantially insoluble. Solvents can be used, however, which dissolve the polymer where this is desired, the polymer then being obtained by pouring the polymerization solution into a solvent in which the polymer is not soluble.

The quantity of polymerization catalyst used can be varied and is generally a function of the unsaturated compounds being polymerized. Generally, from 0.01% to 2.0% by weight based on the total weight of polymerizable compounds present is adequate. Larger amounts can be used if desired, although there is usually no advantage in doing so.

The polymerization can be carried out at or near room temperature or at temperatures above the normal boiling points of the compound being polymerized. In the polymerization of monomeric olefinic compounds with the novel ω-vinyloxyalkylphosphonates, the normally gaseous olefinic compound can be introduced in gaseous or liquid form into a cool reaction vessel containing the novel ω-vinyloxyalkylphosphonate which is advantageously dispersed in an aqueous medium containing a dispersing agent and polymerization initiator. The reaction vessel is then sealed and removed from the cool medium. The polymerization can then be allowed to proceed at room temperature or can be subjected to elevated temperatures. The polymerization can be carried out at atmospheric pressure or at pressures above atmospheric pressure.

An alternative method of preparing homopolymers having the basic structure of the ω-vinyloxyalkylphosphonates in recurring units is also achieved by what is known as an indirect method of polymerization. By this method, a vinyl ω-haloalkyl ether is polymerized in the presence of a cationic catalyst e.g. HgBr$_2$, BF$_3$:etharete and the like and subsequently the product is reacted with a trialkyl phosphite, a mixed alkyl phosphite or a mixed alkyl aryl phosphite or the corresponding alkali metal acid phosphite salt. This latter method is generally preferred for the preparation of homopolymers of the ω-vinyloxyalkylphosphonates of the present invention.

In order to illustrate the present invention but not in any way to limit it thereto the following examples are given.

*Example 1*

PREPARATION OF DIMETHYL 2-VINYLOXYETHYL-PHOSPHONATE

To a refluxing solution of 141 g. (1.0 mole) of CH$_2$=CHOCH$_2$CH$_2$Br (Izvestiya, 1951, 708) in 575 gr. o-dichlorobenzene is added slowly 137 g. (1.1 moles) P(OCH$_3$)$_3$ over a four hour period, while maintaining the temperature above 140° C. Nitrogen is slowly passed over the mixture through a reflux column and finally through a Dry Ice-trichloroethylene trap. Methyl bromide is noted in the trap immediately and ceases to condense about 15 minutes after the addition was complete. Fractional distillation affords 140 g.

$$CH_2=CHOCH_2CH_2P(O)(OCH_3)_2$$

B.P. 135–6° C./25 mm. Analysis: Calc'd. 17.2% P. Found 17.4%.

Example 2

PREPARATION OF DIETHYL 2-VINYLOXYETHYL-PHOSPHONATE

A. *In absence of solvent.*—Into a suitable reaction vessel equipped with stirrer, reflux condenser and thermometer are introduced 39.7 g. (0.37 mole) of vinyl 2-chloroethyl ether and 96 g. (0.58 mole) of triethyl phosphite. The reflux condenser is opened to the atmosphere through a tared Dry Ice-trichloroethylene trap and a calcium chloride drying tube. Following five days of reflux a 10° C. increase in temperature is noted on the fifth day. The reaction mixture is allowed to reflux for an additional six days during which time the temperature reaches 203° C. Distillation of the reaction mixture affords a 50% yield of product, B.P. 138°/17 mm., $n_D^{27}$ 1.4351.

B. *In presence of solvent.*—Into a three-neck flask equipped with a nitrogen bubbler, thermometer and condenser are introduced 450 g. of tetralin (3.41 moles), 249.2 g. (1.50 moles) of triethyl phosphite and 107.0 g. (1.01 moles) of vinyl 2-chloroethyl ether. Nitrogen is bubbled into the solution very slowly. The gases pass through a Dry Ice-trichloroethylene trap. The initial pot reflux temperature is 155.5° C. After nine days during which time the reactants are allowed to reflux the temperature is noted to rise to 199° C. A 74% yield of diethyl 2-vinyloxyethylphosphonate is obtained together with a small amount of the starting materials and $C_2H_5P(O)(OC_2H_5)_2$. The product is water-white, water-soluble and nonflammable, B.P. 162° C./47 mm. $n_D^{25}$ 1.4385.

*Analysis.*—Calculated for $C_8H_{17}O_4P$: C, 46.20; H, 8.18; P, 14.92. Found: C, 46.53; H, 8.56; P, 14.48.

Example 3

PREPARATION OF DIISOPROPYL 2-VINYLOXYETHYL-PHOSPHONATE

Into a suitable reaction vessel is charged 65.4 g. (0.61 mole) of vinyl 2-chloroethyl ether and 375 g. (1.88 moles) of triisopropyl phosphite. The mixture is set to reflux below an 18-inch silvered vacuum jacketed column packed with glass helices. Nitrogen is bubbled slowly through the solution and passed through the head into a Dry Ice-trichloroethylene trap. After 48 hours the reflux pot temperature rises from about 153° C. to 181° C. At this point an additional quantity of vinyl 2-chloroethyl ether, 24.5 g. (0.23 mole) is admitted to the reaction mixture. At the end of a six-hour period the temperature of the reaction mixture rises to 172° C. and an additional quantity of the ether, 15.6 g. (0.146 mole) is then added. The mixture is allowed to reflux for two days during which time the temperature rises to 184° C. Distillation of the reaction mixture affords small amounts of unreacted standing material. A good conversion, 130 g. (76%) to the desired product is obtained. The product is a clear, colorless liquid, insoluble in water and nonflammable, B.P. 121–122° C./6 mm.

*Analysis.*—Calculated for $C_{10}H_{21}O_4P$: C, 50.85; H, 8.89; P, 13.10. Found: C, 51.04; H, 8.93; P, 12.85.

Example 4

(a) PREPARATION OF $C_2H_5OPCl_2$

To a solution of 825 g. (6.0 moles) of $PCl_3$ and 202 g. (2.0 moles) of $(C_2H_5)_3N$ in 2.5 liters of benzene is added slowly, 92.0 g. (2 moles) anhydrous ethanol. The temperature is maintained between 20–25° C. using external cooling. The mixture is stirred for one hour after the addition is complete and filtered to remove the precipitated $(C_2H_5)_3N\cdot HCl$. Most of the excess $PCl_3$ as well as the benzene is removed by distillation at atmospheric pressure and the residue is fractionally distilled. A total of 265 g. of $C_2H_5PCl_2$ is isolated (90%), B.P. 118–9° C. Analysis indicates 51.7% Cl; theory is 51.9%.

(b) PREPARATION OF $C_2H_5OP(OC_8H_{17})_2$

To a solution of 73.5 g. (0.5 mole) $C_2H_5OPCl_2$ and 50.5 g. (0.5 mole) $(C_2H_5)_3N$ in 200 ml. benzene is slowly added 130 g. (1.0 mole) n-octanol. The reaction mixture is kept between 20–25° C. using external cooling. The mixture is stirred for 90 minutes after the addition is complete, and then filtered to remove $(C_2H_5)_3N\cdot HCl$. The product is recovered in a pure state by fractional distillation at low pressure.

(c) PREPARATION OF $(C_2H_5O)P(OC_6H_5)_2$

The procedure of (b) is repeated in all essential respects except that 94.0 g. (1.00 mole) phenol is used in place of n-octanol. A high yield of $C_2H_5OP(OC_6H_5)_2$ is obtained.

(d) PREPARATION OF $CH_2=CHO(CH_2)_{10}Cl$

To a solution of 22 g. (0.50 mole) acetaldehyde in 192.5 g. (1.00 mole) 10-chloro-1-decanol (J. Pharm. Pharmacol. 4, 55, 1952) is added 2.5 g. p-toluene sulfonic acid and this mixture is allowed to stand for 36 hours. The mixture is then diluted with an equal volume of hexane, washed with water, and dried over $Na_2SO_4$. Fractional distillation after flash removal of the hexane affords a good yield of $[Cl(CH_2)_{10}O]_2CCH_3$.

One hundred and fifty g. of the intermediate (0.365 mole) is passed through kaolin at 350° C. (following the general dealcoholisis method described in Compt. rend. 238, 2006 1954) and the condensate is fractionally distilled to separate $CH_2=CHO(CH_2)_{10}Cl$.

Example 5

PREPARATION OF $CH_2=CHO(CH_2)_{10}P(O)(OCH_3)_2$

Sixty-six g. (0.30 mole) $CH_2=CHO(CH_2)_{10}Cl$ as prepared in Example 4(d) is heated to 175° C. Then, during a five hour period, 43.5 g. (0.35 mole) $P(OCH_3)_3$ is slowly dropped into it at a rate such that the temperature of the mixture never drops below 155° C. Nitrogen is very slowly bubbled into the reaction mixture, through a cold water cooled reflux column and finally through a Dry Ice-trichloroethylene trap. Methyl chloride is noted in this trap soon after the addition is started and is evolved continuously until 90 minutes after the addition is complete. Fractional distillation of the reaction mixture affords a fair yield $CH_2=CHO(CH_2)_{10}P(O)(OCH_3)_2$.

Example 6

PREPARATION OF $CH_2=CHOCH_2CH_2P(O)(OC_8H_{17})_2$

A mixture of 167 g. (0.5 mole) $C_2H_5OP(OC_8H_{17})_2$ obtained as in Example 4(b) and 200 g. tetralin is brought to 170° C. in a three-neck flask containing a dropping funnel, thermometer, condenser and nitrogen inlet-outlet. Then a total of 53.2 g. (0.5 mole) of vinyl 2-chloroethyl ether is slowly added during a six hour period, never allowing the pot temperature to drop below 157° C. Nitrogen is bubbled very slowly through the mixture and the stream is passed through Dry Ice-trichloroethylene trap. Condensation of ethyl chloride is noted after 15 minutes and it continues until about one hour after the addition is complete. Fractional distillation of the reaction mixture affords the desired product.

Example 7

PREPARATION OF $CH_2=CHOCH_2CH_2P(O)(OC_6H_5)_2$

A mixture of 131 g. (0.5 mole) $C_2H_5OP(OC_6H_5)_2$ obtained as in Example 4(c) and 250 g. tetralin in a three-neck flask containing a dropping funnel, thermometer, condenser and nitrogen inlet and outlet, is brought to 175° C. Then a total of 53.2 g. (0.5 mole) of vinyl 2-chloroethyl ether is slowly added during a two day period, never allowing the temperature to drop below 160° C. Nitrogen is bubbled very slowly through the solution and the stream is passed through a Dry Ice-trichloroethylene trap. Condensation of ethyl chloride is noted after one hour and continues for about one hour after the addition is complete. The mixture is fractionally distilled to separate $CH_2=CHOCH_2CH_2P(O)(OC_6H_5)_2$.

In a similar manner, other ω-vinyloxyalkylphosphonates can be obtained by replacing the trialkyl phosphite or vinyl-ω-haloalkyl ethers with other compounds selected from those set forth above.

The following examples illustrate the preparation of homopolymers and copolymers of novel ω-vinyloxyalkylphosphonates of the present invention.

*Example 8*

HOMOPOLYMER OF DIETHYL 2-VINYLOXYETHYLPHOSPHONATE PREPARED INDIRECTLY FROM VINYL 2-CHLOROETHYL ETHER

To a solution of 100 g. of vinyl 2-chloroethyl ether in 300 ml. of ethyl ether is added 6 g. of $HgBr_2$. The mixture is allowed to stand at room temperature for about 4–5 hours and a slow exotherm to 34° C. is observed. During this period the formation of two layers is noted. After standing overnight the layers are separated by cooling at —78° C. followed by decanting. Removal of the volatiles from the lower layer affords 74.5 g. of soft tacky polymer. The product is dissolved in 200 ml., 194 g. (1.16 moles), of triethyl phosphite and the mixture is refluxed. Nitrogen is slowly bubbled into the solution. The reaction is continued until the evolution of ethyl chloride, collected in a Dry Ice-trichloroethylene trap, ceases. A 44.5 g. portion of the reaction mixture is mixed with 100 ml. of water. Clarification of the cloudy solution is accomplished by the addition of concentrated HCl. After standing for 24 hours the solution is extracted with two portions of dichloromethane. The extract is dried and the solvent is evaporated. The residue, 23.7 g. (53%), is an orange, slightly mobile oil and is quite tacky. The material readily dissolves in cold water but precipitates as a gum above 40° C.

*Example 10*

POLYMERIZATION OF DIETHYL 2-VINYLOXYETHYLPHOSPHONATE USING DI-t-BUTYL PEROXIDE

A mixture of 0.10 g. di-t-butyl peroxide and 50 g. of diethyl 2-vinyloxyethylphosphonate is degassed, sealed and heated for 24 hours at 135° C. Infrared examination of the viscous oil product indicates the absence of vinyl groups. The molecular weight of a portion of the product which is heated overnight at 56° C./0.1 mm. to remove volatiles therefrom is 1600.

*Example 11*

POLYMERIZATION OF DIISOPROPYL 2 - VINYLOXYETHYLPHOSPHONATE USING DI-t-BUTYL PEROXIDE

A mixture of 0.1 g. of di-t-butyl peroxide and 5 g. of diisopropyl 2 - vinyloxyethylphosphonate is degassed, sealed and heated for 24 hours at 140° C. Following this period of heating, the absence of vinyl groups is observed in the infrared spectrum. The molecular weight of a devolatized sample is 954.

Operating in a manner similar to that illustrated in the above examples, other copolymerizable vinyl type compounds can be copolymerized with the novel ω-vinyloxyalkylphosphonates of this invention. Typical vinyl type compounds having the characteristic grouping $$-\overset{|}{C}=CH_2$$

which may be employed include vinyl acetate, vinyl propionate, vinyl chloride, vinylidene chloride, acrylic acid, α-methylacrylic acid, methyl acrylate, methyl methacrylate, ethyl acrylate, ethyl methacrylate, isopropyl acrylate, isopropyl methacrylate, n-butyl acrylate, n-butyl methacrylate, isobutyl acrylate, isobutyl methacrylate, styrene, ethylene, propylene, isobutylene, acrylonitrile, α-methyl acrylonitrile, acrylamide, α-methyl acrylamide, etc. In addition to the above listed compounds the ω-vinyloxyalkylphosphonates of this invention may also be copolymerized with various unsaturated polyester resins derived from a polybasic acid and a polyhydric alcohol, e.g. maleate and fumarate esters.

The amount of ω-vinyloxyalkylphosphonates present in the polymerization mixture prior to polymerization generally can vary from about 5 to 75% by weight based on the total weight of the unsaturated polymerizable compounds present. It has been found that mixtures containing from about 5 to 20% by weight of the novel ω-vinyloxyalkylphosphonates provide especially useful polymers.

*Example 12*

An unsaturated polyester resin was prepared in a conventional manner employing 1.1 moles of hexachloroendomethylenetetrahydrophthalic acid, 3 moles of maleic anhydride, 4.9 moles of propylene glycol and 1.2 moles of phthalic anhydride. Portions of the polyester resin thus prepared were admixed with styrene and varying amounts of diethyl 2-vinyloxyethylphosphonate. The burning rate and self-extinguishing properties of cast samples ½" x 5" x ⅛" were determined in accordance with the procedure described in ASTM D757–49. The following table summarizes the results of the tests employed.

| Sample | Polyester, Parts | Percent Styrene | Percent DEVP [1] | Percent Phosphorus | Percent Chlorine | Burning rate, inches/min. | Self extinguishing |
|---|---|---|---|---|---|---|---|
| 34–1 | 70 | 23.3 | 6.7 | 1 | 15.35 | 0.27 | Yes. |
| 34–2 | 70 | 16.6 | 13.4 | 2 | 15.35 | 0.26 | Yes. |
| 34–3 | 70 | 30.0 | 0 | 0 | 15.35 | 0.45 | No. |

[1] DEVP=diethyl 2-vinyloxyethylphosphonate.

From the data summarized in the above table it will be seen that the addition of a typical compound of this invention, diethyl 2-vinyloxyethylphosphonate, to a typical unsaturated polyester resin markedly decreases the burning rate of the finished sample as compared with the sample of the polyester to which the monomer is not added. It will be further observed that the burning rate of sample 34–3, the control, is approximately 1.7 times that of samples 34–1 and 34–2. Moreover, the self-extinguishing property of the samples to which diethyl 2-vinyloxyethylphosphonate has been added is particularly noteworthy.

I claim:
1. A compound of the formula

$$CH_2=CHOR\overset{O}{\overset{\|}{P}}(OR')_2$$

in which R is an alkylene radical having from 2 to 10 carbon atoms and R' is selected from the group consisting of aryl radicals and alkyl radicals having from one to eighteen carbon atoms.

2. A homopolymer of a compound as represented in claim 1.

3. A copolymer of a compound as represented in claim 1 and at least one other ethylenically unsaturated polymerizable monomer having the grouping $$-\overset{|}{C}=CH_2$$

4. A process for preparing a compound of the formula $$CH_2=CHORP(OR')_2$$
$$\quad\quad\quad\quad\|\atop O$$

in which R is selected from the group consisting of alkylene radicals having from two to ten carbon atoms and R' is selected from the group consisting of aryl radicals and alkyl radicals having from one to eighteen carbon atoms which comprises reacting a compound of the formula $CH_2=CHORX$ in which R has the meaning as defined hereinabove and X is a halogen atom selected from the group consisting of chlorine, bromine and iodine with a compound selected from the group consisting of: compounds of the formula $P(OR')_3$ in which R' is as defined hereinabove and at least one of the radicals represented by R' is an alkyl radical having from one to eighteen carbon atoms; alkali metal salts of dialkyl acid phosphites; alkali metal salts of diaryl acid phosphites; and alkali metal salts of alkyl aryl acid phosphites.

5. A process as in claim 4 in which the reaction is conducted at a temperature between about 50 and 200° C.

6. A process as in claim 5 in which the reaction is conducted in an inert reaction medium.

7. Diethyl 2-vinyloxyethylphosphonate.

8. Diisopropyl 2-vinyloxyethylphosphonate.

9. A homopolymer of the compound of claim 7.

10. A homopolymer of the compound of claim 8.

11. A copolymer of the compound of claim 7 and at least one other ethylenically unsaturated polymerizable monomer having the grouping $$-\underset{|}{C}=CH_2$$

12. A copolymer of the compound of claim 8 and at least one other ethylenically unsaturated polymerizable monomer having the grouping $$-\underset{|}{C}=CH_2$$

References Cited by the Examiner
UNITED STATES PATENTS

| | | | |
|---|---|---|---|
| 2,632,756 | 3/53 | Harman et al. | 260—91.1 |
| 2,636,027 | 4/53 | Coover et al. | 260—80.3 |
| 2,971,019 | 2/61 | Ladd et al. | 260—461 |

OTHER REFERENCES

Gefter: Organophosphorous Monomers and Polymers, Associated Technical Services, Inc., Glenn Ridge, N.J., pages 20–22, 1962 (original Russian published in 1960).

"Organo Phosphorus Compounds," (Kosolapoff), published by John Wiley & Sons, Inc. (New York), 1950, pages 121–123 relied upon.

JOSEPH L. SCHOFER, *Primary Examiner.*

H. N. BURSTEIN, LEON J. BERCOVITZ, WILLIAM H. SHORT, *Examiners.*